(No Model.)
C. F. TERNEY.
FIREPROOF FLOOR.
No. 493,568. Patented Mar. 14, 1893.
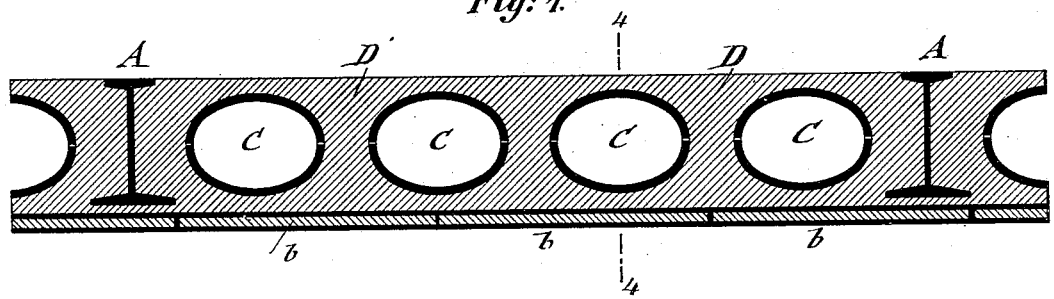
Fig: 1.
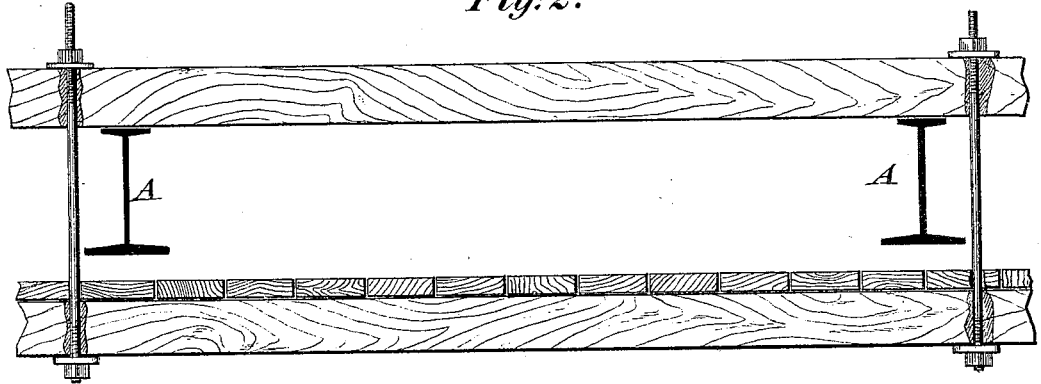
Fig: 2.
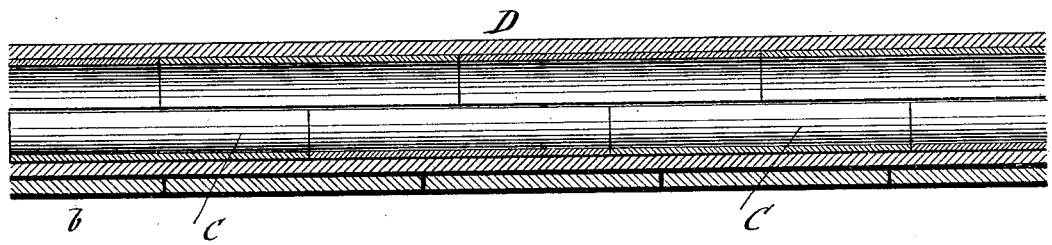
Fig: 3.
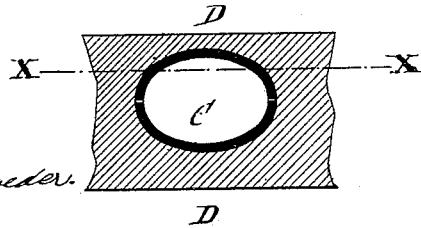
Fig: 4.
WITNESSES:
Charles Schroeder.
Chs. Kälble.
INVENTOR
Charles F. Terney
BY
Goepel & Raegener
ATTORNEYS.

UNITED STATES PATENT OFFICE.

CHARLES F. TERNEY, OF NEW YORK, N. Y.

FIREPROOF FLOOR.

SPECIFICATION forming part of Letters Patent No. 493,568, dated March 14, 1893.

Application filed March 17, 1892. Serial No. 425,257. (No model.)

*To all whom it may concern:*

Be it known that I, CHARLES F. TERNEY, a citizen of the United States, residing in the city, county, and State of New York, have invented certain new and useful Improvements in Fireproof Floors, of which the following is a specification.

The main objection to concrete constructions, in which considerable strength is required in the direction of the span consisted in the less tensile strength of the concrete, through which defect they were liable to sudden failure, without warning, under a superimposed load and also in the great dead load of the constructions themselves, resultant from their manner of treatment. The first objection has been overcome to some extent, through reinforcing the cement concrete bodies by means of interior braces of iron or steel, but the objection of too great a dead load has never been removed successfully, without serious detriment to their strength, on which grounds mainly such constructions have not been adopted for more extensive use in building operations generally.

The main object of my invention is to reduce the dead load of the concrete floors by means of introducing hollow bodies or tubes into the cement concrete body and yet at the same time to increase the strength of the same and consequently the strength of the whole construction as a unit by the manner of treatment and the application of the fragmentary materials. This is accomplished throughout the entire body of cement concrete by means of the hollow tubes in the concrete body, the facing of tiles or cement-slabs at the bottom and the action of the binding matrix, namely, the liquid cement mortar which is cast around the tubes and on top of the tiles at the bottom, by which manner of treatment the cohesiveness and consequently the tensile strength of the monolithic mass into which the whole is transformed so as to act ultimately as a unit, is increased to such an extent as to amount to from three and to six times the tensile strength of pure cement alone, according to and increasing with the age of the construction.

The invention consists of a fire-proof floor, in which a body of cement concrete is supported on inverted T-beams and provided with longitudinal tubes parallel with the beams, around which the concrete-body is cast, so that it forms in connection with the base of the T-beams a rigid mass, which is faced at the underside by means of tiles or cement-plates by which the strength of the same is still more increased.

In the accompanying drawings, Figure 1 represents a vertical transverse-section of my improved fire-proof floor for buildings. Fig. 2 is a vertical transverse-section showing the method of building up the concrete-floors. Fig. 3 is a vertical longitudinal-section on line 4 4, Fig. 1, showing one of the interior tubes arranged in the body of cement concrete, showing the sectional construction of the same and the breaking-off joint of the sections. Fig. 4 is a diagram of a portion of the same, showing the position of the neutral axis, and the parts subjected respectively to compression and tension.

Similar letters of reference indicate corresponding parts.

Referring to the drawings, A represents the inverted T-beams, which are preferably made of steel with small upper flanges and larger lower flanges, which latter rest on the walls or other supports. The connecting filling of cement concrete is cast into the space between the beams by suspending a suitable wooden structure from the beams and laying planks closely on the same as shown in Fig. 2, on which planks the facing $b$ which is made of hard burned tiles, where a fine finish is required, is laid, and grouted on top with liquid cement mortar, the vertical joint between the tiles being filled with plaster of paris, or other suitable material. In all other instances, cement concrete plates will be used in as many layers as required, they being so arranged as to break joint in all directions. The underside of the tiles or plates may be covered with suitable plaster so as to give finish for the ceiling when required. On the tiles or cement-plates the lower course of the cement concrete or plates is cast to the necessary height required to lay the lower sections of the tubes C that are arranged between the beams and extended parallel to the same, and the casting of cement continued up to the edge of the lower sections of the tubes. The upper sections of the tubes are then placed upon the lower sections and the casting of the remaining filling body D of cement concrete is then completed up to the level of the top flanges of the beams B, or higher as may be required.

The tubes C are made in sections which break joint in all directions and may be composed of either hard burned clay, or cement, concrete, or other suitable material, and may be made either in elliptical, oval, circular, or any other form, suitable to the requirements of the construction under different conditions. The tubes are entirely inclosed by the continuous body of cement concrete which forms so to say, a beam of concrete between the reinforcing T-beams. The beam of concrete may be conceived of as being divided by the tubes into a series of smaller beams which are constructed according to the requirements of a beam transversely under a superimposed load, inasmuch as the material composing the same is removed as far as possible from the neutral axis X X, shown in Fig. 4, according to the difference between the modulus of the tensile and compressive strengths of the material, while the material between the tubes connects the several beams into one whole that works ultimately as a unit. The material located near the neutral axis adds but little or almost nothing to the transverse strength of the beam, so that by the removal of the same the construction is not only not weakened but really increased in strength, while the dead load of the structure itself is thereby reduced from forty to fifty per cent., and a far quicker setting and drying of the cement concrete floor is accomplished. The tensile strength of the separate concrete beams into which the floor-space is divided by the steel T-beams in the direction of the span, is further increased by increasing their lower flanges near the bottom edges of the construction, the top flanges being only required for confining the cement concrete filling or body firmly between the flanges of the T-beams, so as to work with the beams as a unit under the deflection or bending produced by a load on the floor. This is where the full strength of the T-beams is brought into action, as they are principally designed to reinforce the concrete beam to the extent of their strength and not more, besides, to secure a bearing on the walls and cross-girders and furnish the means for facilitating the building of the floor, as the framing or flat centers on which the concrete has to be laid and put into place can be hung from them in the usual way.

It is clear that by increasing the depth of the floor and reinforcing the T-beams, any distance may be spanned and any load supported, the strength increasing with the height in the ratio of the square of the distance from the neutral axis. Any suitable covering may be placed on the top of the floor.

The advantages that arise from my improved construction of cement floors are manifold and consist mainly in the fire-proof qualities of the same, next in the resultant economy in material, then preventing the streaking of the ceiling on the lower flanges of the beam by the facing of the tiling or cement plates, which furthermore add considerably to the strength of the structure: finally, the spacing tubes may be utilized for water, gas, drainage or other pipes, electric wires and for heating purposes.

Having thus described my invention, what I claim as new, and desire to secure by Letters Patent, is—

1. A fire-proof floor, consisting of inverted T-beams, having large bottom flanges, an intermediate filling or body of cement concrete between the beams, longitudinal tubes arranged in said filling and formed of semi-sections arranged to break joint with each other, substantially as set forth.

2. A fire-proof floor, consisting of inverted T-beams, having large bottom flanges, an intermediate filling or body of cement concrete between the beams, longitudinal tubes arranged in said filling and formed of semi-sections arranged to break joint with each other, and a face-layer of tiles, or cement concrete-plates, substantially as set forth.

In testimony that I claim the foregoing as my invention I have signed my name in presence of two subscribing witnesses.

C. F. TERNEY.

Witnesses:
PAUL GOEPEL,
CHARLES SCHROEDER.